US011282039B2

(12) United States Patent
Jung

(10) Patent No.: US 11,282,039 B2
(45) Date of Patent: Mar. 22, 2022

(54) SYSTEM FOR PROCESSING AND PROVIDING APPLICANT TAILORED INFORMATION BASED ON ARTIFICIAL INTELLIGENCE

(71) Applicant: Gyou Young Jung, Seoul (KR)

(72) Inventor: Gyou Young Jung, Seoul (KR)

( * ) Notice: Subject to any disclaimer, the term of this patent is extended or adjusted under 35 U.S.C. 154(b) by 288 days.

(21) Appl. No.: 16/475,225

(22) PCT Filed: Apr. 18, 2018

(86) PCT No.: PCT/KR2018/004520
§ 371 (c)(1),
(2) Date: Jul. 1, 2019

(87) PCT Pub. No.: WO2018/208028
PCT Pub. Date: Nov. 15, 2018

(65) Prior Publication Data
US 2019/0340578 A1 Nov. 7, 2019

(30) Foreign Application Priority Data

May 12, 2017 (KR) ........................ 10-2017-0059308

(51) Int. Cl.
*G06Q 10/00* (2012.01)
*G06Q 10/10* (2012.01)
(Continued)

(52) U.S. Cl.
CPC .......... *G06Q 10/1053* (2013.01); *G06N 5/04* (2013.01); *G06Q 50/205* (2013.01)

(58) Field of Classification Search
CPC .. G06Q 10/1053; G06Q 50/205; G06Q 10/10; G06Q 50/20; G06N 5/04; G06N 3/08
See application file for complete search history.

(56) References Cited

U.S. PATENT DOCUMENTS 6,272,467 B1 * 8/2001 Durand ................. G06Q 10/02
705/26.1
6,345,278 B1 * 2/2002 Hitchcock ............ G06F 40/174
(Continued)

FOREIGN PATENT DOCUMENTS

KR 10-2003-0007266 A 1/2003
KR 10-1365371 B1 2/2014
(Continued)

OTHER PUBLICATIONS

"[Into the World] Career Counseling AI, Finding Appropriate Job after Entering Information in 2 seconds", Internet Article, Feb. 12, 2017, Retrieved from URL: http://news.joins.com/article/21242593.

*Primary Examiner* — Gabrielle A McCormick
(74) *Attorney, Agent, or Firm* — Novick, Kim & Lee, PLLC; Sang Ho Lee

(57) ABSTRACT

Provided is a system including an applicant terminal, an application target server, and a platform server. The system collects various kinds of big data of students for admission to higher-grade schools and job seekers for employment, also collects various kinds of big data of schools or companies desired by the students or job seekers, and creates and provides a resume, a self-introduction letter, etc. optimized for the students or job seekers through artificial intelligence (AI).

5 Claims, 9 Drawing Sheets

(51) Int. Cl.
*G06N 5/04* (2006.01)
*G06Q 50/20* (2012.01)

(56) References Cited

U.S. PATENT DOCUMENTS

| | | | | |
|---|---|---|---|---|
| 8,195,657 | B1* | 6/2012 | Dellovo | H04L 67/306 |
| | | | | 707/733 |
| 9,230,212 | B2* | 1/2016 | Su | G06N 20/00 |
| 2003/0125970 | A1* | 7/2003 | Mittal | G06Q 10/10 |
| | | | | 705/321 |
| 2006/0265268 | A1* | 11/2006 | Hyder | G06Q 10/10 |
| | | | | 705/321 |
| 2007/0269786 | A1* | 11/2007 | Jeon | G06Q 10/10 |
| | | | | 434/323 |
| 2009/0006178 | A1* | 1/2009 | Taylor | G06Q 30/0203 |
| | | | | 705/7.32 |
| 2012/0278164 | A1* | 11/2012 | Spivack | G06F 16/951 |
| | | | | 705/14.52 |
| 2014/0222705 | A1* | 8/2014 | Aladdin | G06Q 10/1053 |
| | | | | 705/321 |
| 2015/0161567 | A1* | 6/2015 | Mondal | G06Q 10/1053 |
| | | | | 705/321 |
| 2015/0220885 | A1* | 8/2015 | Cohen | G06Q 10/1053 |
| | | | | 705/321 |
| 2017/0287091 | A1* | 10/2017 | Harrell | G06Q 10/06 |

FOREIGN PATENT DOCUMENTS

| | | |
|---|---|---|
| KR | 10-1454426 B1 | 11/2014 |
| KR | 10-2015-0053317 A | 5/2015 |
| KR | 10-1565676 B1 | 11/2015 |
| KR | 10-2016-0018886 A | 2/2016 |
| KR | 10-2017-0025038 A | 3/2017 |

* cited by examiner

SYSTEM FOR PROCESSING AND PROVIDING APPLICANT TAILORED INFORMATION BASED ON ARTIFICIAL INTELLIGENCE

TECHNICAL FIELD

The present invention relates to a system for processing and providing information customized for an applicant on the basis of artificial intelligence (AI), and more particularly, to the technical field of a system which collects various kinds of big data of students for admission to schools and big data of job seekers for employment, also collects various kinds of big data of schools or companies desired by the students or job seekers, and creates and provides a resume or a self-introduction letter optimized for the students or job seekers through AI.

BACKGROUND ART

According to an announcement of Statistics Korea, in March 2016, the unemployment rate of young people exceeded 12%, which was the highest ever recorded.

The overall unemployment rate also reached the highest level for 6 years, and employment indices were generally degraded.

According to "February Employment Trends" of Statistics Korea in 2016, the number of unemployed young people was 560,000 in the corresponding month, which had increased by 76,000 compared to the same month in 2015. This trend of young people's unemployment rate had been continuously rising from 7.4% in October 2015 to 8.1% in November and 9.5% in January 2016 and finally reached 12% in March 2016.

Meanwhile, although the unemployment of young people was leading up to a terrible situation, domestic small companies and mid-size companies suffered from a lack of manpower. Eight out of ten companies suffered from a lack of manpower because there were almost no applicants for the companies.

The lack of manpower is not the problem of only small and mid-sized companies. Large companies also have difficulties in finding fit people therefore and are making efforts, such as using various means and methods, to find people suitable therefore.

The lack of mutual information communication between job seekers and companies is a reason for the lack of manpower in small and mid-sized companies and a reason for large companies' efforts to find fit people. There have been various personal and technical attempts at such communication.

There is a related prior art "Method for writing resume and personal history by using big data (Korean Patent No. 10-1565676; hereinafter, referred to as "Patent Literature 1")."

The prior technology according to Patent Literature 1 includes: a step of accessing a capability evaluation server through a personal terminal; a step of selecting an achieved work description module managed by a server and then selecting one or more themes about certain experience in a certain time period; a step of separately writing and storing achieved works including situations corresponding to each of the selected themes, actions in the situations, and results of the actions; selecting a strong point examination module managed by the server and then selecting an individual's strong point corresponding to a certain keyword from content written as the achieved works using the certain keyword; a step of selecting a functional competency assessment module managed by the server and then, when one or more functional competencies required for a function in which the individual is interested are selected, aggregating, by the capability evaluation server, these pieces of information and automatically deriving certain functional competencies required for the function; and a step of writing an optimal self-introduction letter or resume for the individual on the basis of a capability-oriented resume managed by the server and a certain functional competency derived by a self-introduction letter module. It is possible to readily determine a function of interest for each individual who will be evaluated and whether the corresponding individual has capabilities required for the function. Also, since an opportunity to develop capabilities required for a function of interest is provided, it is possible to write a resume or a self-introduction letter in relation to the capabilities required for the function.

There is another related prior art "Job matching system between foreign workers and Korean company owners (Korean Patent Application No. 10-2002-0068967; hereinafter, referred to as "Patent Literature 2")."

According to a method of Patent Literature 2, when a Korean business owner who wants to employ foreigners accesses a service server, information in an area for displaying information on job seekers desired by the user is provided on the user's web browser. Various kinds of information on respective job seekers are provided to the user's computer according to information data of job seekers desired by the user, and a service for classifying job seekers according to nationality, sex, age, educational background, work experience, desired working time, desired working period, desired workplace, desired salary, condition of accommodations, etc. is also provided at the user's request.

On the other hand, when a foreign worker who wants to work in Korea accesses the service server, information in an area for displaying information on employers desired by the user is provided on the user's web browser. Various kinds of information on respective employers are provided to the user's computer according to information data of employers desired by the user, and a service for classifying employers according to company type, business category, working time, working period, workplace, salary, condition of accommodations, etc. is also provided at the user's request.

Employers talk with job seekers, and vice versa, about questions that they want on a web browser using channels, such as memos and bulletin boards, and coordinate opinions, and a service for notifying a person of a memo which has arrived through a phone call or a text message is included.

Basically, a native language, Korean, and English are used to make an input. When an interpretation request button is pressed in the case of requiring interpretation or translation, all memos and posts between a job seeker and an employer are interpreted or translated such that the accuracy and reliability of communication can be improved.

Also, the sole communication bulletin board related to foreigner recruitment and employment in Korea is managed and used as an information exchange channel of people who have similar interests.

In addition, "Personalized education recommendation system (Korean Patent Application No. 10-2013-0135000; hereinafter, referred to as "Patent Literature 3")" may be considered another prior art.

A personalized education recommendation system based on development throughout a user's whole life according to Patent Literature 3 includes: a user information collection module composed of an input unit configured to receive personal information of a user and a storage unit configured to store the user's personal information; a recommended occupation group extraction module configured to generate recommended occupation group information by matching aptitude information of the user with statistical aptitude information through a job information server including the statistical aptitude information, in which types of occupation groups and aptitudes of workers in each type of occupation group are statistically found; a recommended occupation group selection module configured to receive a preferred occupation group among a plurality of recommended occupation groups of the recommended occupation group information from the user and generate preferred occupation group information; a matching module configured to generate matching information by calculating item-specific differences between statistical learning ability information of the preferred occupation group and learning ability information of the user; and a target information providing module composed of an information collection unit configured to build an education database (DB) or a job content DB by receiving, classifying, and storing education content, which is obtained by receiving education information from an education information server and classifying and storing school-specific education models and the like, and job content and an information providing unit configured to generate target information by extracting content of a specific job or a specific school included in a collection of the education content DB or the job content DB and provide the generated target information to the user.

Patent Literature 2 and Patent Literature 3 correspond to arts different from an operation of finding crossings between various pieces of information of a job applicant and various pieces of information of a company.

Patent Literature 1 corresponds to a slightly advanced art of writing a resume and a self-introduction letter customized to each individual (a job seeker) but does not propose a technical spirit of providing customized information to a job seeker according to various pieces of information of a company, for example, culture of the company, competent people desired by the company, functional competency required by the company, and the like.

In other words, it is necessary to build a platform which is mutually beneficial for both companies and job seekers, and this process involves a technique for processing big data of both individuals and companies on the basis of artificial intelligence (AI) which is recently attracting attention.

PRIOR ART LITERATURE

Patent Literature

Korean Patent No. 10-1565676 (published on Nov. 5, 2015)
Korean Unexamined Patent Publication No. 10-2002-0068967 (published on Jan. 23, 2003)
Korean Unexamined Patent Publication No. 10-2013-0135000 (published on May 18, 2015)

DISCLOSURE

Technical Problem

A system for processing and providing information customized for an applicant on the basis of artificial intelligence (AI) according to the present invention is directed to solving the aforementioned conventional problems and provides the following objectives.

First, the present invention is directed to providing a platform which can directly or indirectly allow mutual communication of information between students who want to enter a higher-grade school or job seekers and schools or companies.

Second, the present invention is directed to providing a platform which can connect applicants and schools or companies to each other using not only big data of applicants but also big data of schools or companies desired by the applicants.

Third, the present invention is directed to proposing a platform which can write an application for school admission, a job application, a resume, a self-introduction letter, an essay, or the like through AI on the basis of big data of applicants and schools or companies and provide the written document to an applicant.

Fourth, the present invention is directed to providing a platform which can accumulate optimal histories of applicants or companies through deep learning of AI and continuously find optimal matches between applicants and companies over time and not only once.

Objectives of the present invention are not limited to those mentioned above, and other objectives not mentioned above will be clearly understood by those of ordinary skill in the art from the following description.

Technical Solution

A system for processing and providing information customized for an applicant on the basis of artificial intelligence (AI) according to the present invention has the following solutions.

One aspect of the present invention provides a system for processing and providing information customized for an applicant on the basis of AI, the system including an applicant terminal configured to be managed by an applicant who intends to apply for a job or enter a higher-grade school and receive personal information from the applicant, an application target server configured to be managed by a company or a school and provide recruitment information for the job or school admission information of the school, and a platform server configured to receive the personal information from the applicant terminal and collect activity information of the applicant from an external server by networking with the applicant terminal and the application target server and provide customized information to the applicant through the applicant terminal by i) matching the appropriate personal information and activity information for the recruitment information or ii) matching the appropriate personal information and activity information for the school admission information.

In the system for processing and providing information customized for an applicant on the basis of AI, the application target server may include a school server configured to be managed by the school and provide the school admission information to the applicant terminal through the platform server and include a company server configured to be managed by the company and provide the recruitment information to the applicant terminal through the platform server.

In the system for processing and providing information customized for an applicant on the basis of AI, the platform server may include: an AI processing unit configured to collect the activity information from the external server and generate the customized information by matching the appropriate personal information and activity information to the recruitment information or matching the appropriate personal information and activity information to the school admission information; a control unit configured to transmit the customized information to the applicant terminal by receiving the personal information from the applicant terminal, transmitting the personal information to the AI processing unit, receiving the recruitment information or the school admission information from the application target server, and transmitting the recruitment information or the school admission information to the AI processing unit; and an application management unit configured to transmit the recruitment information or the school admission information to the control unit.

In the system for processing and providing information customized for an applicant on the basis of AI, the application management unit may include: a personal information receiving section configured to receive the personal information of the applicant from the applicant terminal and transmit the personal information to the AI processing unit, an activity information acquiring section controlled by the AI processing unit to acquire the activity information of the applicant from the external server and transmit the activity information to the AI processing unit, a target information acquiring section configured to acquire the recruitment information or the school admission information from the application target server and transmit the recruitment information or the school admission information to the AI processing unit, a form information acquiring section configured to acquire templates of documents related to the school admission information from the application target server and transmit the templates to the AI processing unit, and an application processing section configured to cause the application target server to perform a job application or school admission application process by transmitting the customized information to the application target server when the customized information is confirmed by the applicant terminal.

In the system for processing and providing information customized for an applicant on the basis of AI, the activity information may include at least one of social network service (SNS) information, hobby information, sports information, personal relationship information, and political orientation information obtainable from the external server by an action of the applicant.

In the system for processing and providing information customized for an applicant on the basis of AI, the templates may include at least one of a resume form, a self-introduction form, and a job application form provided by the company and include a school admission form or a self-introduction form provided by the school.

In the system for processing and providing information customized for an applicant on the basis of AI, the customized information may be modified and updated by the applicant terminal.

In the system for processing and providing information customized for an applicant on the basis of AI, the AI processing unit may generate the customized information by i) matching the appropriate school or company to the applicant according to the personal information and the activity information and ii) writing the personal information and the activity information according to the templates of documents.

In the system for processing and providing information customized for an applicant on the basis of AI, the application management unit may further include a history management section configured to cumulatively collect the personal information and the activity information of the applicant, periodically match the applicant with the company or the school, and recommend the applicant and the company or the school to each other.

In the system for processing and providing information customized for an applicant on the basis of AI, the history management section may continuously acquire other applicant personal information or other applicant activity information of other applicants selected by the school or the company from the application target server, and the AI processing unit may send feedback of the continuously acquired other applicant personal information or other applicant activity information of the other applicants, match the personal information and the activity information of the applicant and the other applicant personal information or other applicant activity information of the other applicants to each other, and recommend the applicant and the company or the school to each other.

Advantageous Effects

The system configured as described above for processing and providing information customized for an applicant on the basis of artificial intelligence (AI) according to the present invention provides the following effects.

First, an AI-based platform server finds optimal matches between applicants and schools or companies through AI on the basis of activity information and input information of students or job seekers and i) (when applicants are students) school traditions, school-specific major characteristics, professor characteristics or ii) (when applicants are job seekers) atmospheres of companies, visions of companies, tendencies of chief executive officers (CEOs), intensity and characteristics of required functions, and the like.

Second, in addition to the above-described optimal matching function, the AI-based platform server provides a function of writing and proposing a customized application, resume, self-introduction letter, etc. according to forms of application, resume, self-introduction letter, etc. suggested by schools or companies through AI on the basis of input information, major information, grade information, functional information, and other activity information of an applicant.

Fourth, the system accumulates histories of applicants or companies through deep learning of AI and continuously finds optimal matches between them over time and not only once.

Effects of the present invention are not limited to those mentioned above, and other effects not mentioned above will be clearly understood by those of ordinary skill in the art from the following description.

Figure 1:
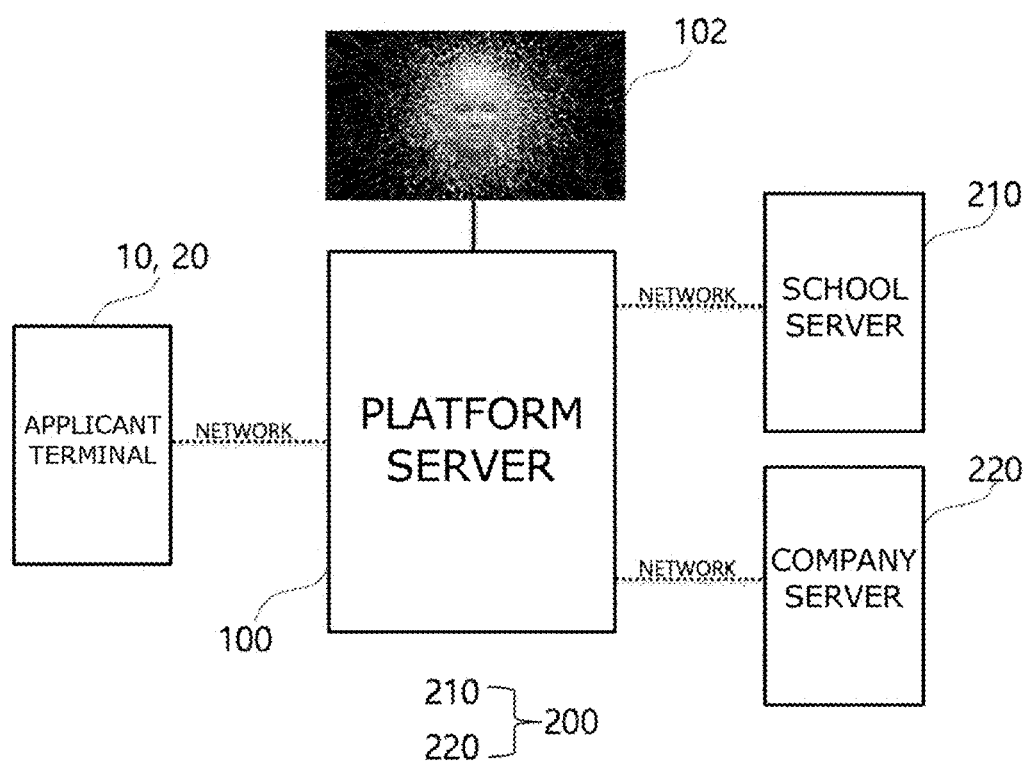
FIG. 1 is a block diagram showing respective elements of a system for processing and providing information customized for an applicant on the basis of artificial intelligence (AI) according to the present invention and operational relationships between the elements.

REFERENCE SIGNS LIST 10, 20: applicant terminal
11: (native) person who wants to enter a higher-grade school
12: (native) person who wants to have a job
21: (foreigner) person who wants to enter a higher-grade school
22: (foreigner) person who wants to have a job
100: platform server
101: control unit
102: AI processing unit
103: database
110: application management unit
110a: school admission management unit
110b: company joining management unit
111: personal information receiving section
112: activity information acquiring section
113: target information acquiring section
114: form information acquiring section
115: application processing section
116: history management section
200: application target server
210: school server
220: company server

MODES OF THE INVENTION

A system for processing and providing information customized for an applicant on the basis of artificial intelligence (AI) according to the present invention may be diversely modified and have several embodiments. Therefore, specific embodiments will be shown in the drawings and described in detail below. However, it is not intended to limit the present invention to the specific embodiments, and the present invention should be construed as including all modifications, equivalents, and alterations within the spirit and technical scope of the present invention.

Figure 2:
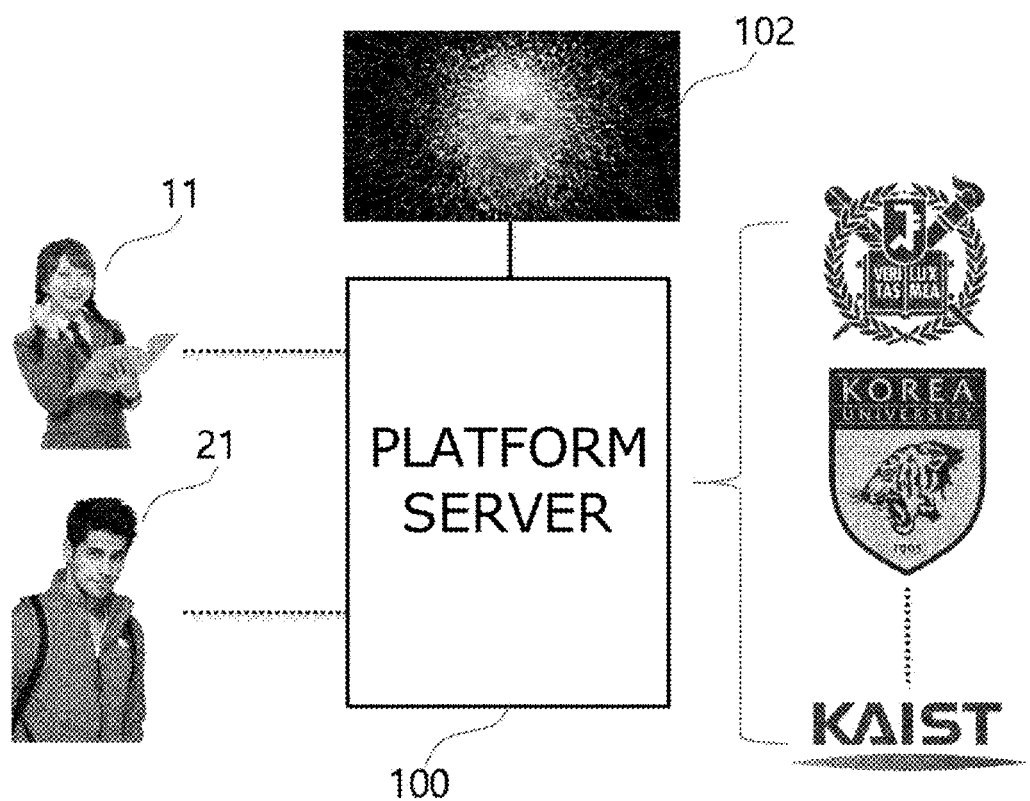
FIG. 2 is a conceptual view showing a platform server which matches people who want to enter a higher-grade school, that is, applicants, and domestic schools to each other according to an embodiment of the present invention.
Figure 3:
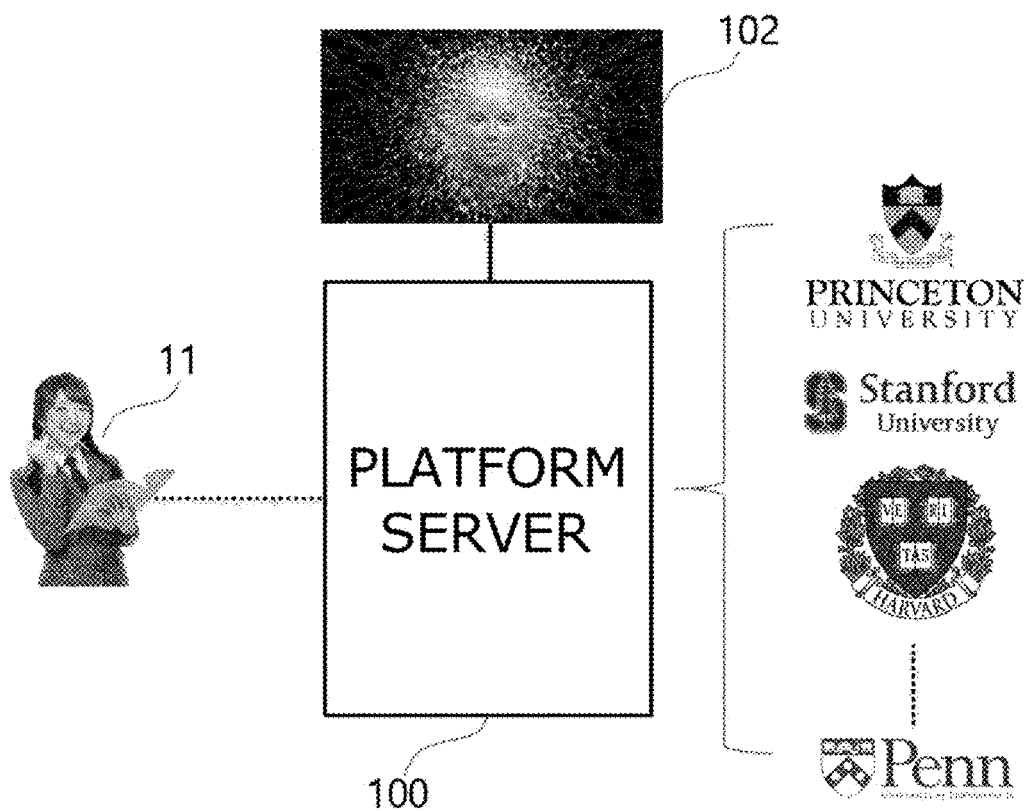
FIG. 3 is a conceptual view showing a platform server which matches people who want to enter a higher-grade school, that is, applicants, and foreign schools to each other according to an embodiment of the present invention.
Figure 4:
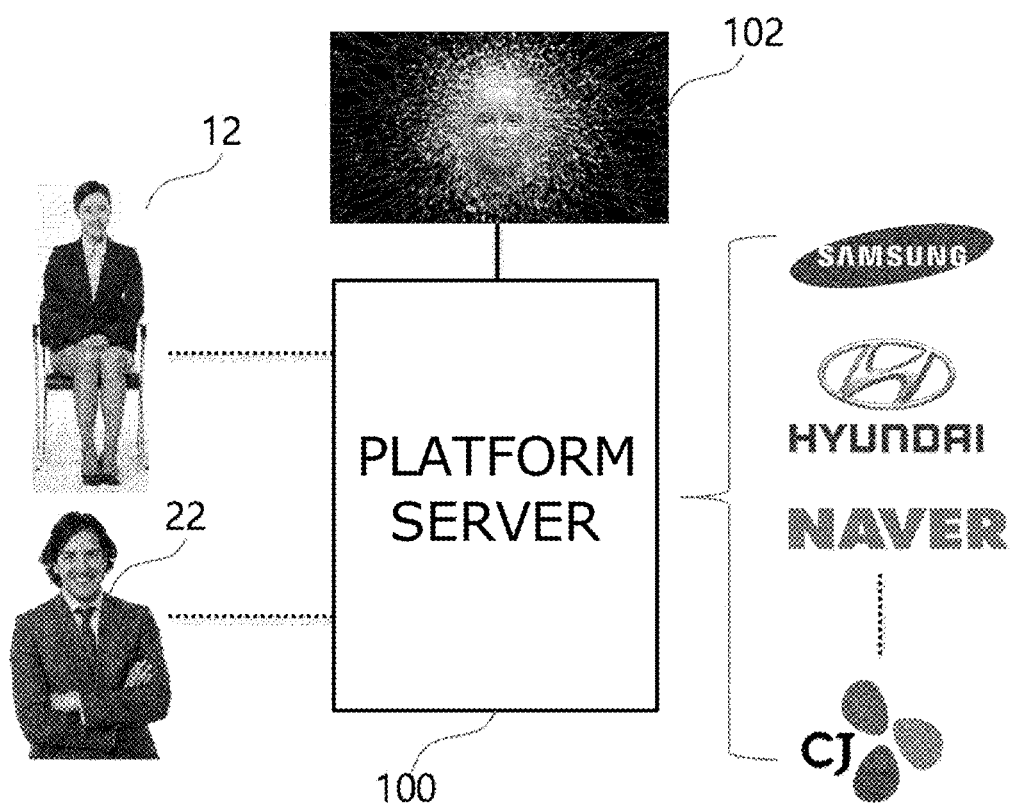
FIG. 4 is a conceptual view showing a platform server which matches people who are looking for a job, that is, applicants, and domestic companies to each other according to an embodiment of the present invention.
Figure 5:
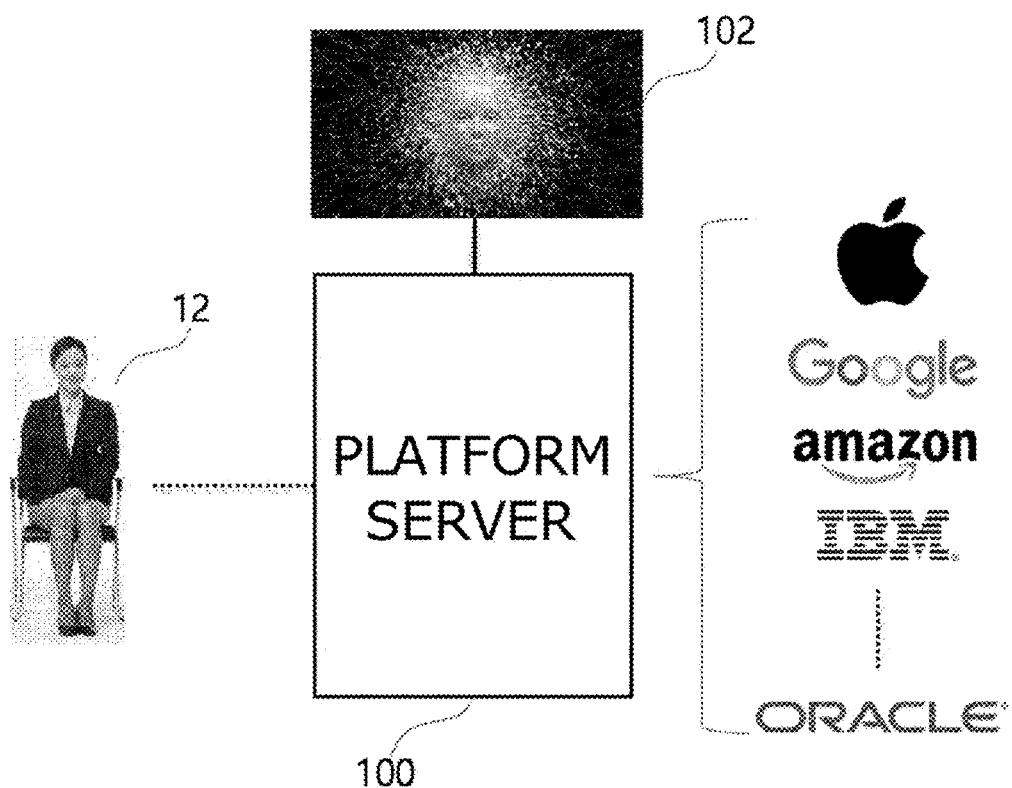
FIG. 5 is a conceptual view showing a platform server which matches people who are looking for a job, that is, applicants, and foreign companies to each other according to an embodiment of the present invention.
Figure 6:
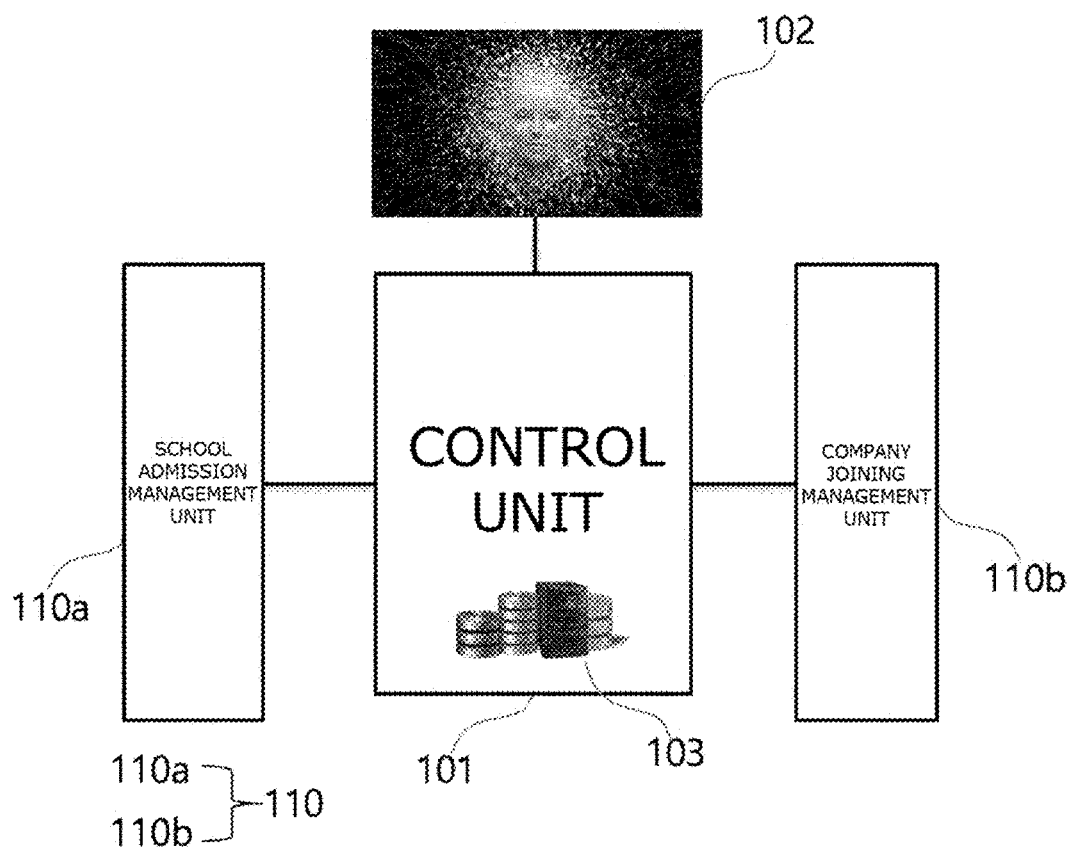
FIG. 6 is a block diagram showing respective elements of a system for processing and providing information customized for an applicant on the basis of AI according to the present invention and operational relationships between sub-elements thereof.
Figure 7:
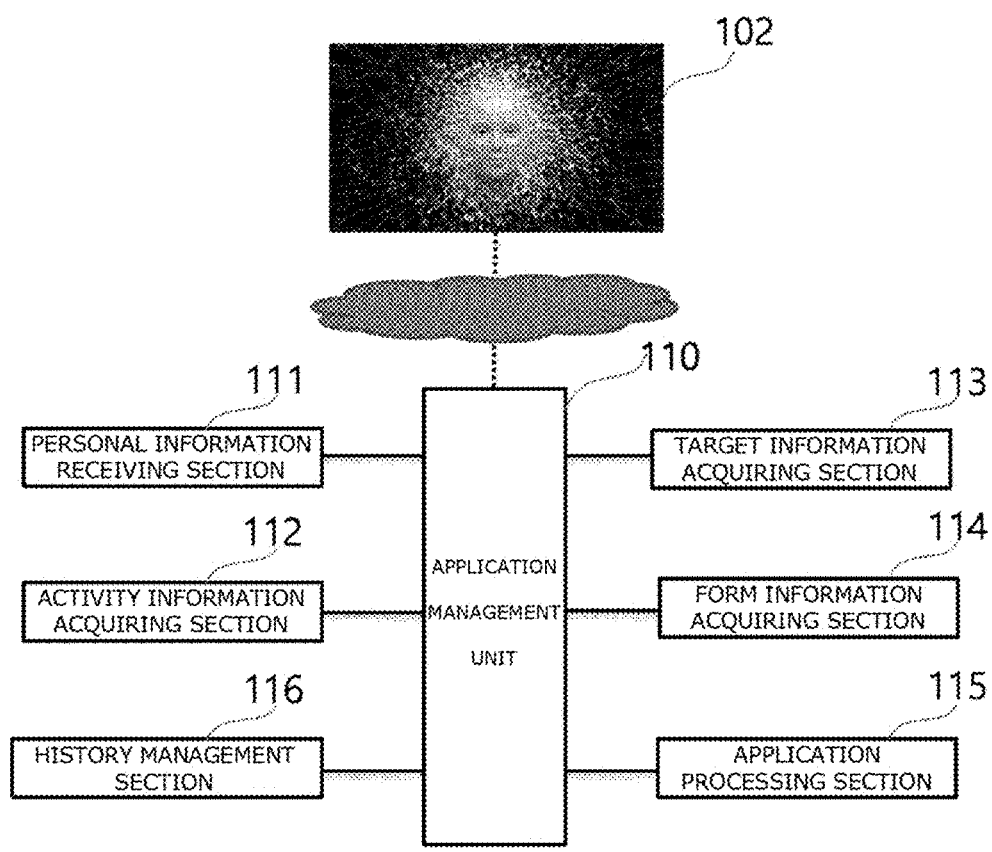
FIG. 7 is a block diagram showing a school admission (company joining) management unit and relationships between sub-elements thereof according to an embodiment of the present invention.
Figure 8:
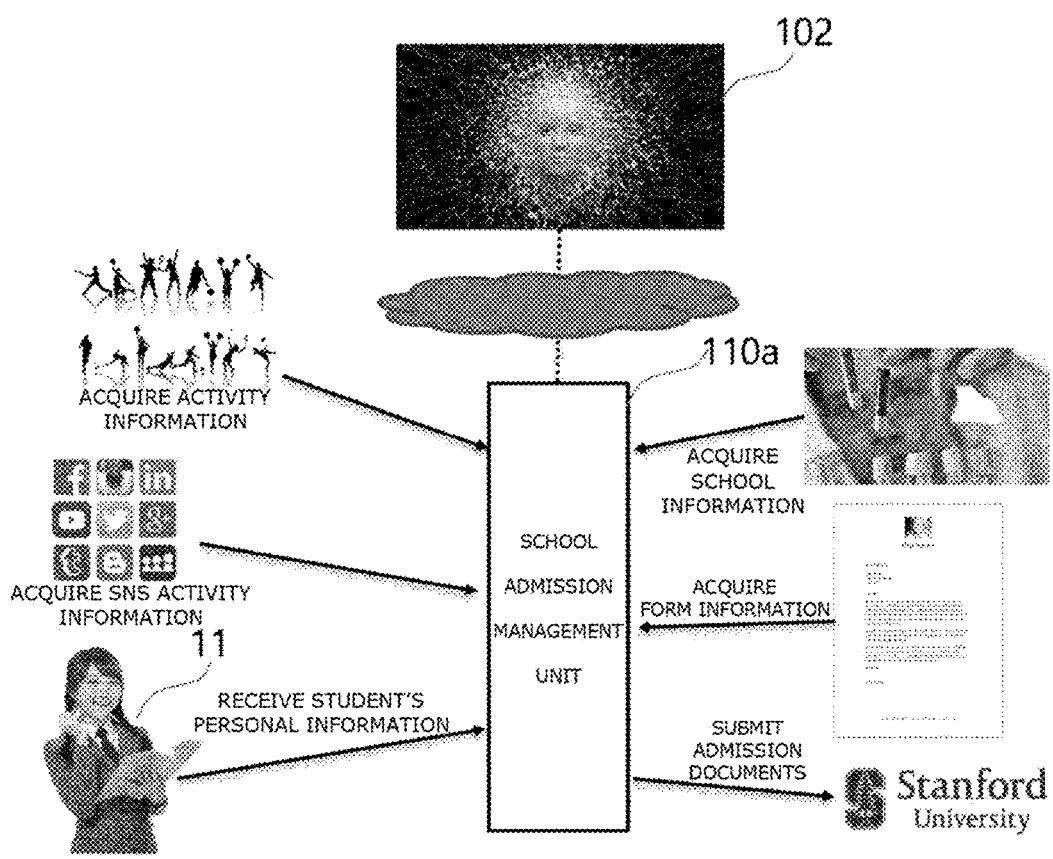
FIG. 8 is a conceptual view of a school admission management unit which connects a person who wants to enter a higher-grade school and a (foreign) school to each other according to an embodiment of the present invention.
Figure 9:
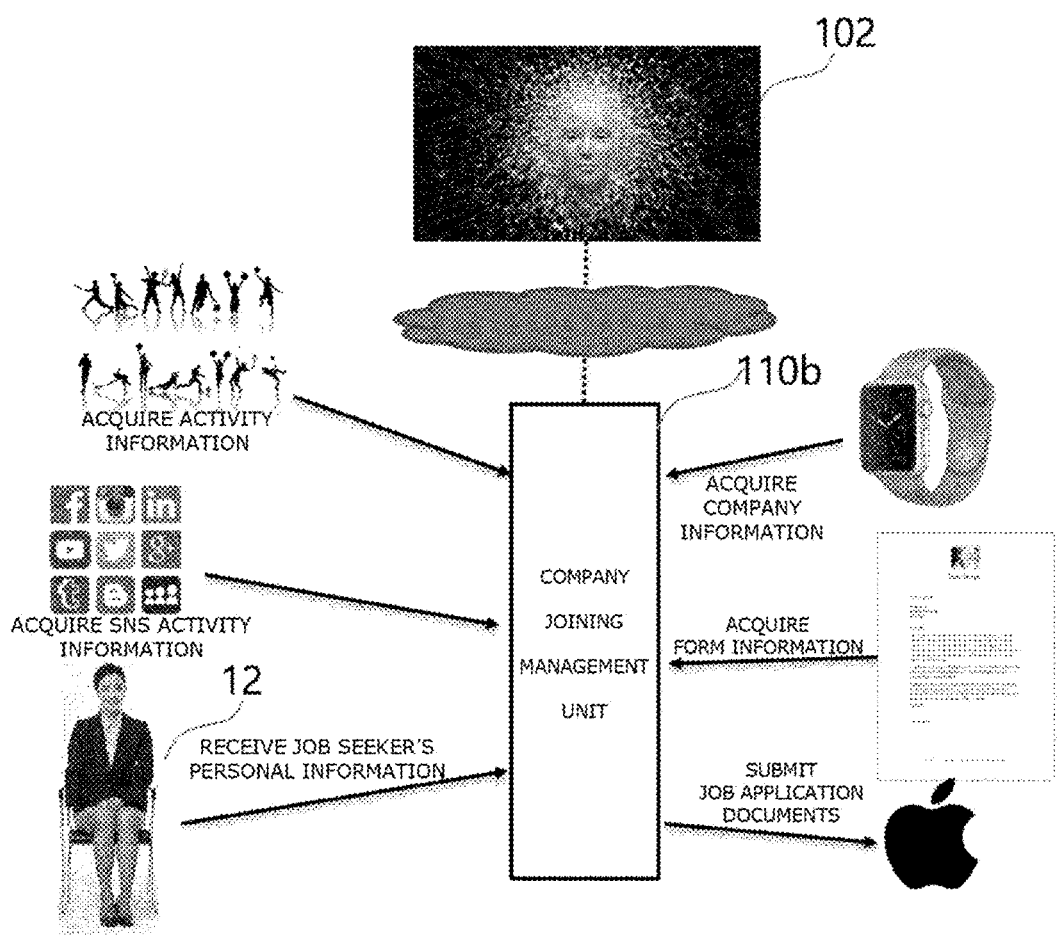
FIG. 9 is a conceptual view of a company joining management unit which connects a person who wants to have a job and a (foreign) company to each other according to an embodiment of the present invention.

FIG. 1 is a block diagram showing respective elements of a system for processing and providing information customized for an applicant on the basis of AI according to the present invention and operational relationships between the elements. FIG. 2 is a conceptual view showing a platform server which matches people who want to enter a higher-grade school, that is, applicants, and domestic schools to each other according to an embodiment of the present invention. FIG. 3 is a conceptual view showing a platform server which matches people who want to enter a higher-grade school, that is, applicants, and foreign schools to each other according to an embodiment of the present invention. FIG. 4 is a conceptual view showing a platform server which matches people who are looking for a job, that is, applicants, and domestic companies to each other according to an embodiment of the present invention. FIG. 5 is a conceptual view showing a platform server which matches people who are looking for a job, that is, applicants, and foreign companies to each other according to an embodiment of the present invention. FIG. 6 is a block diagram showing respective elements of a system for processing and providing information customized for an applicant on the basis of AI according to the present invention and operational relationships between sub-elements thereof. FIG. 7 is a block diagram showing a school admission (company joining) management unit and relationships between sub-elements thereof according to an embodiment of the present invention. FIG. 8 is a conceptual view of a school admission management unit which connects a person who wants to enter a higher-grade school and a (foreign) school to each other according to an embodiment of the present invention. FIG. 9 is a conceptual view of a company joining management unit which connects a person who wants to have a job and a (foreign) company to each other according to an embodiment of the present invention.

As shown in FIG. 1, a system for processing and providing information customized for an applicant on the basis of AI according to the present invention includes a platform server 100 which connects applicant terminals 10 and 20 and an application target server 200, for example, a school server 210 or a company server 220, to each other. Overall processing of the platform server 100 is based on AI.

First, the applicant terminals 10 and 20 are terminals managed by applicants and include a mobile terminal, a desktop personal computer (PC), and a laptop PC.

The applicant terminals 10 and 20 are managed by the applicants, receive certain commands from the applicants, receive various kinds of personal information of the applicants from the applicants, and transmit the personal information to the platform server 100.

To perform the above-described functions, the applicant terminals 10 and 20 should be capable of wired or wireless data communication with an external terminal, server, etc., and have a function and hardware for downloading and installing a certain program, application, or the like therein.

Examples of the applicant terminals 10 and 20 may be recent smart phones, such as Galaxy S series of Samsung Electronics Inc. and iPhones of Apple Inc., or tablet PCs, such as Galaxy Tabs or iPads. However, these are only preferable examples, and the applicant terminals 10 and 20 can be any terminal which is capable of data communication, in which software can be downloaded and installed, to which various instructions of a manager can be input, and which can output various kinds of information through a display or the like as described above.

An "applicant" may indicate a job applicant who is looking for a job, a higher-grade school applicant who wants to enter a higher-grade school, or the like, and an applicant may be a student or a current employee. An applicant may be considered a person who wants to be a direct or indirect member of the application target server 200 through school admission, recruitment, or the like.

Referring to FIGS. 2 to 5, an applicant may be a native school applicant 11 or a foreign school applicant 21 or a native job applicant 12 or a foreign job applicant 22.

The application target server 200 is a server managed by an institute, a corporation, or the like in which the above-described applicant wants to be a member. For example, the application target server 200 is a server managed by a company or a school, and the application target server 200 may be an agent which posts information including requirements for being a member thereof and the like.

An embodiment of an agent which manages the application target server 200 may be a domestic college, a foreign college, a domestic company, or a foreign company as shown in FIGS. 2 to 5.

Information posted by the application target server 200 may be school admission information when the management agent of the application target server 200 is a school and may be recruitment information when the management agent of the application target server 200 is a company.

The platform server 100 is an element which connects the above-described applicant terminals 10 and 20 and the application target server 200 to each other by performing data networking with the applicant terminals 10 and 20 and the application target server 200 and serves as a platform.

The platform server 100 may execute AI functions using internal or external resources thereof. Referring to FIGS. 2 to 5, the platform server 100 has a function of selecting an optimal application target (a school or a company) for an applicant, conversely, selecting an optimal applicant (a student or a job seeker) for an application target (a school or a company), and matching them to each other by actively using an element called an AI processing unit 102.

More specifically, the platform server 100 may receive personal information of applicants from the applicant terminals 10 and 20 and collect activity information of the applicants from an external server. Subsequently, the platform server 100 may match optimal companies or schools to the applicants through optimal matching between the personal information and activity information of the applicants and school admission information or recruitment information and also provides optimal customized information to the applicants.

The term "personal information" indicates information on an individual generally required for having a job or entering a higher-grade school. The term is not clearly defined in the law and indicates personal information required by a company or a school.

"Personal information" may include at least one of identity information, educational background information, grade information, club activity information, volunteering information, social activity information, major information, language score information, award information, license information, family information, desired major information, desired country information, desired salary information, desired function information, desired job information, clinical history and health information, military record information, criminal record information, religion information, etc. of the applicants.

The term "activity information" indicates information that can be acquired from several fields in which the applicants generally work excluding personal information. However, such "activity information" can be acquired within a range in which the platform server 200 is directly allowed to acquire activity information from the applicant.

"Activity information" may include social network service (SNS) activity information, for example, information on the applicants' interests and hobbies in daily life, well-acquainted fields, etc. obtainable through SNS activities and indicates information which enables AI to find the degree of personal relationship through SNS activities. "Activity information" makes it possible to find the applicants' other tendencies through details of credit card expenditure and the like as well as SNS activity information. In addition, it is possible to find the applicants' interests, tendencies, values, etc. through news, articles, etc. that are read by the applicants through the applicant terminals 10 and 20 with interests in daily life. Such "activity information" enables the platform server 200, more specifically, the AI processing unit 102, to be involved in estimating the applicants' next activities and near-future activities or near-future determinations in a specific situation through a statistical technique and deep learning.

In addition, an external server which collects "activity information" may be a server for tracking daily behavior patterns of the applicants, such as an SNS server, a server for managing credit cards, a sports or entertainment server, and a music providing or service server. Needless to say, it is possible to read information on the applicants' behavior and activities from such a server only when the administrator of the server and the applicants agree with the reading.

The term "recruitment information" indicates, when the management agent of the application target server 200 is a company, qualifications, requirements, procedures, or the like for entering the company.

The term "school admission information" indicates, when the management agent of the application target server 200 is a school, qualifications, requirements, procedures, or the like for entering the school.

The term "customized information" indicates, when the applicants are students, information generated by analyzing the applicants' personal information and activity information, such as grades, and reprocessing the personal information and activity information according to school admission information.

For example, when school admission information includes 1) admission application, 2) self-introduction letter, etc. required by a specific school, the platform server 100, more specifically, the AI processing unit 102, automatically writes personal information and activity information according to the forms of the admission application and the self-introduction letter and provides the written admission application and self-introduction letter to the applicant. Subsequently, the applicant checks and then confirms or modifies the automatically written admission application and self-introduction letter, and the confirmed or modified admission application and self-introduction letter are transmitted to the application target server 200 such that an company joining procedure is performed.

The platform server 100 or the AI processing unit 102 analyzes a form pattern of the admission application or the self-introduction letter, searches a database (DB) of personal information and activity information according to a predefined keyword, and processes and generates customized information using a statistical technique of AI and the like.

The application target server 200 may include a school server 210 and a company server 200 as shown in FIG. 6.

First, the school server 210 is a server managed by a school, for example, a college, a special-purpose high school, or the like. The school server 210 posts and provides the above-described school admission information to the applicant terminals 10 and 20 through the platform server 100.

The company server 220 is managed by a company, for example, a private company, a public institution, a governmental institution, or the like and provides recruitment information, such as recruitment information, open recruitment information, and requirements for employment, to the applicant terminals 10 and 20 through the platform server 100.

In the system for processing and providing information customized for an applicant on the basis of AI, the platform server 100 may include the AI processing unit 120, a control unit 101, and an application management unit.

As described above, the AI processing unit 102 is provided with activity information from an external server, matches appropriate personal information or activity information to recruitment information or school admission information, and directly generates and processes the above-described customized information.

The control unit 101 is an element which connects various elements in the platform server 100 and also is a central processing unit which supports various kinds of data processing between the elements.

The control unit 101 receives the personal information of the applicants from the applicant terminals 10 and 20 to transmit the received personal information to the AI processing unit 102 and receives recruitment information or school admission information from the application target server 200 to transmit the received recruitment information or school admission information to the AI processing unit 102. Ultimately, the control unit 101 aids the AI processing unit 102 with processing and then, when customized information is processed through the AI processing unit 102, transmits the customized information to the applicant terminals 10 and 20. Subsequently, when the applicants confirm or modify the customized information through the applicant terminals 10 and 20, the control unit 101 transmits the customized information, for example, job applications or resumes, to the application target server 200 through the application management unit 110 such that a school admission or recruitment process may be performed.

The application management unit 110 receives and transmits the recruitment information or the school admission information to the control unit 101. Also, the application management unit 110 transmits the customized information to the application target server 200 as described above.

As shown in FIG. 7, in the system for processing and providing information customized for an applicant on the basis of AI according to the present invention, the application management unit 110 may include a personal information receiving section 111, an activity information acquiring section 112, a target information acquiring section 113, a form information acquiring section 114, and an application processing section 115.

As described above, the personal information receiving section 111 receives the personal information of the applicants from the applicant terminals 10 and 20 and transmits the received personal information to the AI processing unit 102.

The personal information of the applicants collected by the personal information receiving section 111 is stored in a DB 103 and securely processed. The stored personal information may be read through a keyword search or the like, and the stored personal information becomes raw data of the above-described customized information.

The activity information acquiring section 112 is an element controlled by the AI processing unit 102. The activity information acquiring section 112 acquires the above-described activity information of the applicants.

As described above, the activity information acquiring section 112 acquires the activity information of the applications from an external server. The activity information acquiring section 112 also stores information on a right to access the external server therein or in a DB. Subsequently, the activity information acquiring section 112 may access the external server with the given access right and acquire activity information automatically or after obtaining the applicants' consent (every time the applicants do activities).

The target information acquiring section 113 acquires recruitment information or school admission information from the application target server 200 and transmits the recruitment information or school admission information to the AI processing unit 102.

The target information acquiring section 113 may be given a right to access the school server 210 or the company server 220 in advance and acquire recruitment information or school admission information.

The form information acquiring section 114 acquires templates of specific document forms, for example, a job application, a school admission application, a resume, a self-introduction letter, etc. suggested by a school or a company, in school admission information or recruitment information from the application target server 200 and transmits the templates to the AI processing unit 102. The acquired templates may become reference information constituting a search word query for personal information and activity information.

The application processing section 115 transmits a resume, a job application, a school admission application, a self-introduction letter, etc. written by AI according to the above-described customized information, that is, templates of a school or a company, to the application target server 200, that is, the school or the company, such that a process for school admission or company joining may be performed.

As described above, the AI processing unit 102 generates customized information by i) matching the personal information and the activity information to school admission information and recruitment information of a school or a company and ii) writing the personal information and the activity information according to the templates of documents.

In the system for processing and providing information customized for an applicant on the basis of AI, the application management unit 110 may additionally include a history management section 116.

The history management section 116 is an element which cumulatively collects personal information and activity information of the applicants and periodically matches the applicants to a company or a school according to the collected personal information and activity information.

This is because the personal information of the applicants is changing information which is updated and upgraded over time and the activity information also is changing information which is updated and upgraded over time. Also, this is because recruitment information or school admission information of a company or a school varies according to varying period atmospheres, economic trends, policy movements, and industrial trends.

The history management section 116 readjusts big data by updating the big data with a relative preference change based on both kinds of the changing information over time.

Moreover, the history management section 116 continuously acquires other applicant personal information or other applicant activity information of other applicants selected by the school or the company from the application target server 200 and continuously updates a target person preferred by the school or the company. Subsequently, the AI processing unit 102 sends feedback of the continuously acquired other applicant personal information or other applicant activity information of the other applicants, matches the personal information and the activity information of the applicants and the other applicant personal information or the other applicant activity information to each other, and recommends the applicants and the company or the school to each other.

The scope of the present invention is determined by the claims. Parentheses used in the claims are not intended for selective limitations but rather intended to clarify elements, and a statement in parentheses should be construed as an essential element.

The invention claimed is:

1. A system for processing and providing information customized for an applicant on the basis of artificial intelligence (AI), the system comprising:
   an applicant terminal configured to be managed by an applicant who intends to apply for a job or enter a higher-grade school and receive personal information from the applicant;
   an application target server configured to be managed by a company or a school and provide recruitment information for the job or school admission information of the school; and
   a platform server configured to receive the personal information from the applicant terminal and collect activity information of the applicant from an external server by networking with the applicant terminal and the application target server, receive the recruitment information or the school admission information from the application target server, and provide customized information to the applicant through the applicant terminal by i) matching the personal information and activity information to the recruitment information or ii) matching the personal information and activity information to the school admission information;
   wherein the platform server comprises:
   an AI processing unit configured to collect the activity information from the external server and generate the customized information by matching the personal information and activity information to the recruitment information or matching the personal information and activity information to the school admission information;
   a control unit configured to transmit the customized information to the applicant terminal by receiving the personal information from the applicant terminal, transmitting the personal information to the AI processing unit, receiving the recruitment information or the school admission information from the application target server, and transmitting the recruitment information or the school admission information to the AI processing unit the control unit configured to control the applicant terminal to modify and update the customized information according to varying economic trends, policy movements, and industrial trends; and
   an application management unit configured to transmit the recruitment information or the school admission information to the control unit,
   wherein the application management unit comprises:
   a personal information receiving section configured to receive the personal information of the applicant from the applicant terminal and transmit the personal information to the AI processing unit;
   an activity information acquiring section controlled by the AI processing unit to acquire the activity information of the applicant from the external server and transmit the activity information to the AI processing unit;
   a target information acquiring section configured to acquire the recruitment information or the school admission information from the application target server and transmit the recruitment information or the school admission information to the AI processing unit;
   a form information acquiring section configured to acquire templates of documents related to the school admission information or the recruitment information from the application target server and transmit the templates to the AI processing unit; and
   an application processing section configured to cause the application target server to perform a job application or school admission application process by transmitting the customized information to the application target server when the customized information is confirmed by the applicant terminal,
   wherein the application management unit further comprises a history management section configured to cumulatively collect the personal information and the activity information of the applicant, periodically match the applicant to the company or the school; and recommend the applicant and the company or the school to each other,
   wherein the history management section continuously acquires other applicant personal information and other applicant activity information of other applicants selected by the school or the company from the application target server and continuously updates a target person preferred by the school or the company, and
   wherein the AI processing unit sends feedback of the continuously acquired other applicant personal information and other applicant activity information of the other applicants, matches the target person preferred by the school or the company and the personal information and the activity information of the other applicants, and recommends the other applicants and the company or the school to each other.

2. The system of claim 1, wherein the application target server comprises:
   when the platform server matches the personal information and activity information to the school admission information, a school server configured to be managed by the school and provide the school admission information to the applicant terminal through the platform server; and
   when the platform server matches the personal information and activity information to the recruitment information, a company server configured to be managed by the company and provide the recruitment information to the applicant terminal through the platform server.

3. The system of claim 1, wherein the activity information includes at least one of social network service (SNS) information, hobby information, sports information, personal relationship information, and political orientation information obtainable from the external server by an action of the applicant.

4. The system of claim 1, wherein the templates include at least one of a resume form, a self-introduction form, a job application form provided by the company or include a school admission form or a self-introduction form provided by the school.

5. The system of claim 1, wherein the AI processing unit generates the customized information further by i) matching the school or company to the applicant according to the personal information and the activity information and ii)

writing the personal information and the activity information according to the templates of documents.

\* \* \* \* \*